(12) United States Patent
Qiao

(10) Patent No.: US 10,809,842 B2
(45) Date of Patent: Oct. 20, 2020

(54) ACTIVE TOUCH INPUT DEVICE PAIRING NEGOTIATION

(71) Applicant: Microsoft Technology Licensing, LLC, Redmond, WA (US)

(72) Inventor: Tianzhu Qiao, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 711 days.

(21) Appl. No.: 15/166,021

(22) Filed: May 26, 2016

(65) Prior Publication Data

US 2017/0344171 A1 Nov. 30, 2017

(51) Int. Cl.
*G06F 3/041* (2006.01)
*G06F 3/0354* (2013.01)
*G06F 3/038* (2013.01)
*G06F 3/14* (2006.01)
(Continued)

(52) U.S. Cl.
CPC ............ *G06F 3/0416* (2013.01); *G06F 3/038* (2013.01); *G06F 3/03545* (2013.01); *G06F 3/044* (2013.01); *G06F 3/147* (2013.01); *G06F 3/1446* (2013.01); *G09G 2300/026* (2013.01); *G09G 2356/00* (2013.01); *G09G 2370/04* (2013.01);
(Continued)

(58) Field of Classification Search
None
See application file for complete search history.

(56) References Cited

U.S. PATENT DOCUMENTS 6,262,696 B1 7/2001 Seraphim et al.
6,646,647 B1 11/2003 Surgutchik et al.
7,532,196 B2 5/2009 Hinckley
(Continued)

FOREIGN PATENT DOCUMENTS

WO 2010028406 A1 3/2010
WO 2014135847 A2 9/2014

OTHER PUBLICATIONS

"International Search Report and Written Opinion Issued in PCT Application No. PCT/US2017/032989", dated Aug. 2, 2017, 13 Pages.
(Continued)

*Primary Examiner* — Amare Mengistu
*Assistant Examiner* — Sarvesh J Nadkarni
(74) *Attorney, Agent, or Firm* — Alleman Hall Creasman & Tuttle LLP

(57) ABSTRACT

A source touch display device includes a communication interface, a source touch sensor, and a controller. The communication interface is configured to communicatively couple the source touch display device with a target touch display device. The controller configured to receive, via the source touch sensor, touch inputs from an active input device, determine that the active input device will likely move from the source touch sensor to a target touch sensor of the neighboring target display device based on the touch inputs, send, via the communication interface, active input device pairing information to the target touch display device, receive, via the communication interface, target touch display device pairing information from the target touch display device, and send the target touch display device pairing information to the active input device to effect a pairing between the active input device and the target touch display device.

19 Claims, 6 Drawing Sheets

(51) Int. Cl.
 *G06F 3/147* (2006.01)
 *G06F 3/044* (2006.01)
(52) U.S. Cl.
 CPC ... *G09G 2370/042* (2013.01); *G09G 2370/16* (2013.01)

(56) References Cited

U.S. PATENT DOCUMENTS

| | | | |
|---|---|---|---|
| 7,592,970 | B2 | 9/2009 | Matthies et al. |
| 7,765,490 | B2 | 7/2010 | Lai et al. |
| 8,120,596 | B2 | 2/2012 | Popovich et al. |
| 8,305,294 | B2 | 11/2012 | Cok et al. |
| 8,359,551 | B2 | 1/2013 | Fabrick, II |
| 8,441,467 | B2 | 5/2013 | Han |
| 8,692,789 | B2 | 4/2014 | Chen et al. |
| 8,736,568 | B2 | 5/2014 | Sleeman et al. |
| 8,810,543 | B1 | 8/2014 | Kurikawa |
| 2007/0124503 | A1* | 5/2007 | Ramos .............. G06F 3/017 709/248 |
| 2007/0182663 | A1 | 8/2007 | Biech |
| 2010/0138767 | A1 | 6/2010 | Wang et al. |
| 2010/0149090 | A1* | 6/2010 | Morris .............. G06F 3/017 345/156 |
| 2011/0231783 | A1* | 9/2011 | Nomura ............ G06F 3/0488 715/761 |
| 2012/0050231 | A1 | 3/2012 | Westhues et al. |
| 2012/0086659 | A1 | 4/2012 | Perlin et al. |
| 2012/0105346 | A1* | 5/2012 | Chen ............... G06F 3/04883 345/173 |
| 2012/0169646 | A1 | 7/2012 | Berkes et al. |
| 2012/0223903 | A1 | 9/2012 | Ludwig |
| 2013/0097532 | A1 | 4/2013 | Reeves et al. |
| 2013/0106792 | A1 | 5/2013 | Campbell et al. |
| 2013/0113725 | A1* | 5/2013 | Seo ................. G06F 3/0383 345/173 |
| 2013/0271487 | A1 | 10/2013 | Lincoln |
| 2013/0285957 | A1 | 10/2013 | Kim et al. |
| 2014/0059498 | A1 | 2/2014 | McCormack et al. |
| 2014/0152324 | A1 | 6/2014 | Schwartz et al. |
| 2014/0307168 | A1 | 10/2014 | Law et al. |
| 2015/0022494 | A1 | 1/2015 | Azumi et al. |

OTHER PUBLICATIONS

Hinckley, et al., "Stitching: Pen Gestures that Span Multiple Displays", In Proceedings of Working Conference on Advanced Visual Interfaces, May 25, 2004, pp. 1-9.
Bader, et al., "Lift-and-Drop: Crossing Boundaries in a Multi-Display Environment by Airlift", In Proceedings of Working Conference on Advanced Visual Interfaces, May 25, 2010, 9 pages.
Franz, et al., "An Interactive Dynamic Tiled Display System", Retrieved on: Mar. 10, 2016 Available at: http://julianofranz.com/papers/AnInteractiveDynamicTiledDisplaySystem.pdf.
Hinckley, Ken, "Synchronous Gestures for Multiple Persons and Computers", In Proceedings of 16th Annual ACM Symposium on User Interface Software and Technology, Nov. 2, 2003, 10 pages.
Schmalstieg, et al. ,"Hybrid User Interfaces Using Seamless Tiled Displays", In Proceedings of 8th Immersive Projection Technology Workshop, May 2004, 8 pages.
Chen, et al., "LumiPoint: Multi-User Laser-Based Interaction on Large Tiled Displays", In Technical Report CS-TR-2000-04, Jun. 2000, 11 pages.
U.S. Appl. No. 14/746,640, Westhues, et al., "Multiple Matrix Differential Touch Sense", filed Jun. 22, 2015.
Liu, L. et al., "Phase-Locking of Tiled Fiber Array using SPGD Feedback Controller," Proceedings of SPIE 5895, Target-in-the-Loop: Atmospheric Tracking, Imaging, and Compensation II, 58950P, Aug. 23, 2005, Bellingham, WA, 9 pages.
ISA European Patent Office, International Search Report and Written Opinion Issued in Application No. PCT/US2016/032953, dated Aug. 1, 2016, WIPO, 12 pages.
IPEA European Patent Office, Second Written Opinion Issued in PCT Application No. PCT/US2016/032953, dated May 3, 2017, WIPO, 6 pages.

* cited by examiner

ACTIVE TOUCH INPUT DEVICE PAIRING NEGOTIATION

BACKGROUND

Multiple touch sensing display devices may be arranged adjacent one another in a "tiled" arrangement to increase overall size of a touch display system, provide custom aspect rations, etc. Such an arrangement can allow touch inputs to be sensed on target touch display devices as a touch input source (e.g., active stylus) moves from one touch device to the next. Moreover, tiled arrangements can allow different touch input sources to provide touch input in different regions of the touch display system at the same time.

DETAILED DESCRIPTION

Figure 1:
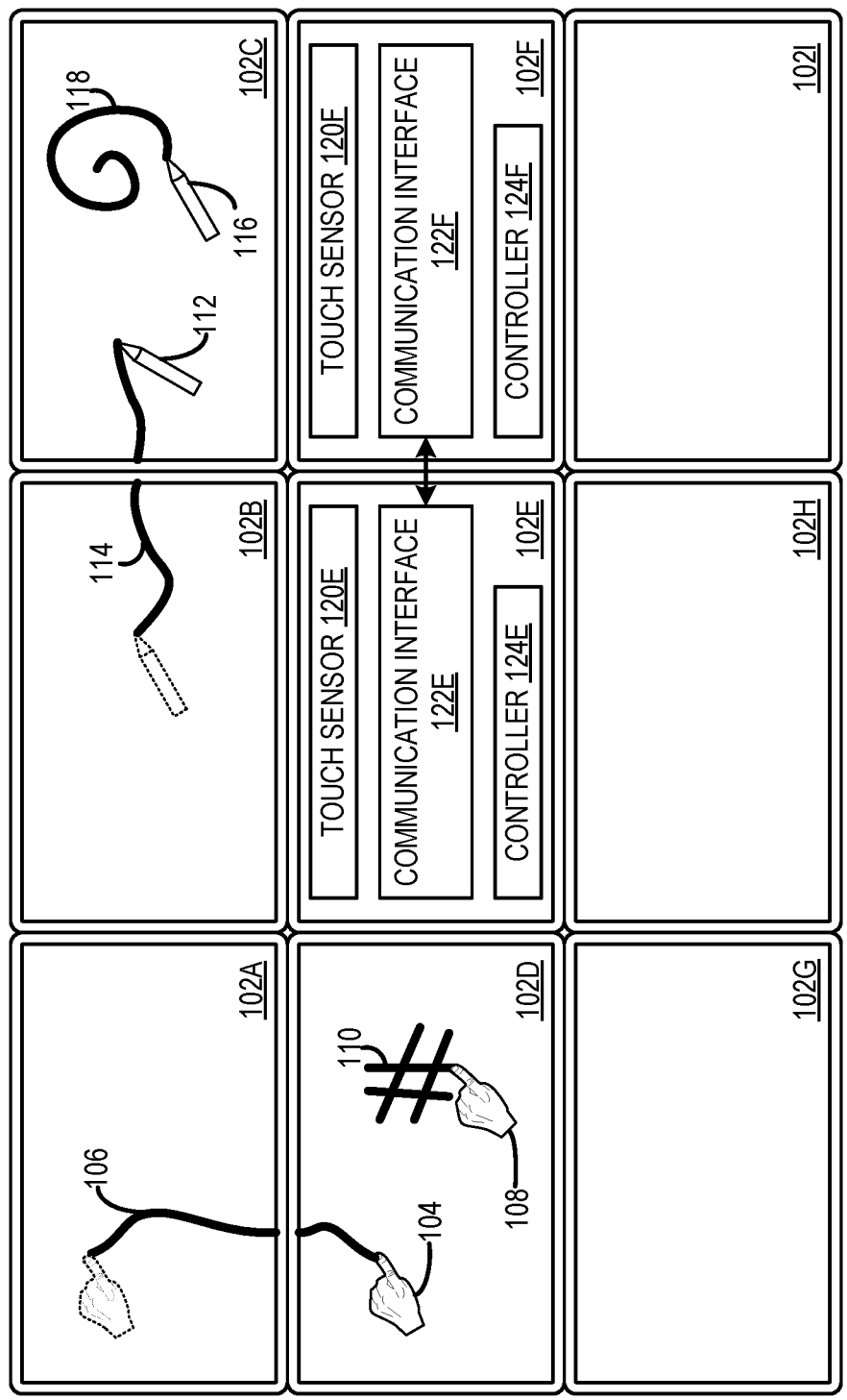
FIG. 1 shows a tiled touch display system with multiple touch display devices.

In a tiled touch display system with multiple touch display devices, an active input device, such as an active stylus, has to pair with a particular touch display device before that device can recognize touch inputs from the active input device. In particular, the pairing process enables the touch display device to associate a particular touch input signal with the active input device. The pairing process typically includes multiple communications between the active input device and the touch display device that occur over a duration (e.g., multiple touch input frames). As a result of pairing, when the touch display device senses the particular touch input signal, the touch display device knows that the particular touch input signal is being provided by the active input device.

In one example, the pairing process is initiated when an active input device is close enough to a touch sensor of a touch display device to receive a synchronization signal provided by the touch sensor. In other words, the active input device has to be proximate (e.g., touching or hovering) to the touch sensor of the touch display device in order for pairing to be initiated. In the case of an active stylus, sufficient proximity typically occurs as a result of an above-threshold electrostatic coupling between the stylus tip electrode and row/column electrodes of the display device touch sensor. When the above pairing approach is employed in a tiled system, various issues may arise due to there being multiple display devices.

For example, when an active input device moves from a source touch display device to a target touch display device, it typically takes some time for the active input device to pair with the target touch display device. This can cause a break and/or latency on sensing touch inputs. In drawing/inking applications, this can result in visual jitter, broken trace lines and the like. In another example, the active input device can provide an inaccurate touch input signal, because the active input device does not know when it has moved to the target touch display device. For example, the active input device may continue to provide a touch input signal associated with the source touch display device when the active input device has moved to the target touch display device. Providing the touch input signal to the target touch display device can cause signal interference with other active input devices that are paired with the target touch input device (e.g., both active input devices provide the same signal or use the same time slot).

Accordingly, the present description contemplates a pairing approach employed by touch display devices of a tiled touch display system to reduce latency/interruption, mitigate signal interference/competition, enhance pairing transfers, and otherwise improve input device functionality in tiled systems. In particular, according to one contemplated pairing approach, a source touch display device determines (e.g., predicts) that an active input device will likely move from the source touch display device to a target display device, such determination being performed based on touch inputs provided by the active input device to the source touch display device. For example, inputs occurring over multiple touch frames may permit an assessment that a stylus (1) is near the boundary between two display tiles, (2) is moving toward a target device with a particular speed and direction, (3) will therefore arrive at the target device in a particular location and at a particular time. In any event, as a result of the determination that the input device will likely move to the target display, the source touch display device sends active input device pairing information to the target touch display device. Also, the source touch display device receives target touch display device pairing information from the target touch display device (e.g., a particular stylus slot that is available for use by an incoming stylus). Further, the source touch display device sends the target touch display device pairing information to the active input device to effect a pairing between the active input device and the target touch display device.

By having the source touch display device initiate pairing negotiations with the target touch display device before the active input device has moved away from the source touch display device, the active input device can be paired with the target touch display device at an earlier time relative a pairing approach in which pairing is performed between the active input device and the target touch display device based on the active input being positioned proximate to a touch sensor of the target touch display device. In other words, as a result of determining that the input device will likely move to the target display device, communication occurs between the display devices and the input device so that pairing to the target display can be effected seamlessly and activated at the optimal moment (e.g., right as the input device moves on to the target display device).

FIG. 1 shows an example touch display system 100 including two or more touch display devices 102 (e.g., 102A-102I) arranged in a "tiled" pattern in which each touch display device 102 neighbors one or more other touch display devices. As used herein, "neighbor" describes any touch display device positioned directly along a side or a corner of a particular touch display device. For example, touch display device 102E has eight neighboring (potential target) touch display devices (i.e., four side neighbors: 102B, 102F, 102H, 102D; and four corner neighbors: 102A, 102C, 102I, 102G). In another example, touch display device 102A has three neighboring touch display devices (i.e., two side neighbors: 102B, 102D; and one corner neighbor 102E). In the depicted example, each of the touch display devices 102 may have a diagonal dimension of greater than 30 inches. In some particularly large-format implementations, this diagonal dimension can be 55 inches or greater. These are but examples; one or more touch display devices may be used in a nearly limitless range of configurations.

Among other things, use of multiple touch display devices 102 in the touch display system 100 may enable the realization of products in different form factors, shapes, sizes, aspect ratios, etc. Regardless of the particular number and configuration of the touch display devices 102 included in the touch display system 100, each touch display device 102 is configured to sense touch inputs from one or more passive and/or active touch input sources. In particular, for each touch display device 102, touch sensing occurs dynamically over a sequential progression of touch sensing frames during which touch sensor circuitry interprets electrical conditions existing on an electrode matrix of a touch sensor.

In the depicted example, a finger 104 provides passive touch input to the touch display device 102A represented by an ink trace 106. As the finger 104 moves from the touch display device 102A to 102D, the ink trace 106 is displayed by both of the touch display devices 102A and 102D. Further, the touch display device 102D is configured to sense touch input from a second finger 108 to produce an ink trace 110 while the finger 104 is producing the ink trace 106. Likewise, an active stylus 112 provides active touch input to the touch display device 102B represented by an ink trace 114. As the active stylus moves from the touch display device 102B to 102C, the ink trace 114 is displayed by both of the touch display devices 102B and 102C. Further, a second active stylus 116 provides touch input to the touch display device 102C that is represented by ink trace 118. The touch display device 102C is configured to recognize and differentiate touch input from both of the active styluses 112 and 116 at the same time.

In general, each of the plurality of touch display device 102 are configured to detect touch inputs from multiple different active and/or passive touch input sources at the same time. In some implementations, a limited number of active input devices may be paired with a touch display device 102 at a given time, due to a limited touch sensing frame size, for example. In one example, each of the plurality of touch display device 102 is configured to pair with up to three active input devices at a time. An active input device may include any suitable device that provides an electrical signal to a touch sensor of a touch display device for purposes of determining a position of the active input device relative to the touch sensor.

Each of the plurality of touch display devices 102 may include a touch sensor 120, a communication interface 122, and a controller 124. In the depicted example, such components are representatively shown as being included in touch display devices 102E and 102F. Note that such components are included in each of the plurality of touch display devices 102 of the touch display system 100. In the course of discussion, the touch display device 102E may be referred to as a "source touch display device" and the touch display device 102F may be referred to as a "target touch display device." A source touch display device is characterized as a touch display device from which an active input device is moving off of or away from. A target touch display device is characterized as a touch display device to which the active input device is moving to. In one example of such a relationship, the touch display device 102B acts as a source touch display device for active stylus 112, and the touch display device 102C acts as a target display device for active stylus 112.

The touch sensor 120E is configured to sense touch inputs from various passive and/or active touch sources. In one example, the touch sensor 120E includes a matrix of electrodes that form capacitors whose capacitances are evaluated to detect touch inputs. Touch sensor componentry is described in further detail below with reference to FIG. 2.

The communication interface 122E is configured to communicatively couple the source touch display device 102E with one or more other touch display devices 102 of the touch display system 100. In one example, the communication interface 122E is configured to communicatively couple the touch display device 102E with every other touch display device 102 of the touch display system 100. The communication interface 122E may include any suitable wired or wireless communication hardware. The communication interface 122E may employ any suitable type and/or number of different communication protocols to communicatively couple the touch display device 102E with another touch display device, such as target touch display device 102F. Non-limiting examples of such communication protocols include WiFi, Bluetooth, and Ethernet.

Furthermore, the communication interface 122E is configured to communicatively couple the source touch display device 102E with one or more active input devices, such as active stylus 112. In one example, such communication is achieved via a wireless link (e.g., a radio transmitter). In another example, such communication is achieved via a capacitive coupling via one or more electrodes of the touch sensor 120E. In other words, the communication interface 122E may control the touch sensor 120E for purposes of communication with an active input device. For example, the touch display device 102E may communicate with an active input device, via the communication interface 122E, to receive various information including, but not limited to, position data, active input device information (e.g., an individualized identifier, firmware version), and pairing information.

The controller 124E is configured to perform operations related to touch sensing and display functionality of the touch display device 102E. More particularly, as described above, the controller 124E is configured to initiate pairing negotiations with the target touch display device 102F based on a determination that an active input device will likely move from the source touch sensor 120E to a target touch sensor 120F of the target touch display device 102F. The controller 124E makes such a determination based on touch inputs provided by the active input device to the touch sensor 120E. In one example, the controller 124E is configured to send, via the communication interface 122E, active input device pairing information to the target touch display device 102F, receive, via the communication interface 122E, target touch display device pairing information from the target touch display device 102F, and send the target touch display device pairing information to the active input device to effect a pairing between the active input device and the target touch display device. For example, the source touch display device 102E may send the pairing information to the active stylus via a wireless radio channel.

By performing such pairing negotiations with the source touch display device, the active input device may be paired with the target touch display device earlier than if the active input device were to pair with the target touch display device directly in response to moving to the target touch display device. In some instances, such pairing negotiations may enable the active input device to be paired with the target touch display device prior to the active input device moving to the target touch sensor. Accordingly, a break and/or latency of touch input sensing and displayed inking performed by the target may be reduced or eliminated.

In some implementations, the controller 124E is configured to unpair the source touch display device 102E with the active input device based on recognizing that the active input device has moved to the target touch sensor 120F. For example, the active input device may be unpaired with the source touch display device 102E in order to open a pairing slot for another active input device to pair with the source touch display device. In one example, the controller 124F notifies the controller 124E of a successful pairing between the target touch display device 102F and the active input device, and the controller 124E unpairs with the active input device in response to receiving the notification. In another example, the controller 124F notifies the controller 124E when a position of the active input device has moved a threshold distance inward from an outer boundary of the target touch sensor 120F, and the controller 124E unpairs with the active input device in response to receiving the notification.

Furthermore, in response to exchanging pairing information with the source touch display device, the controller 124F of the target touch display device may be configured to pair with the active input device. In one example, if the target touch display device 102F has a slot available for the active input device, then the target touch display device 102F may send a broadcast message to the active input device to initiate pairing. On the other hand, if the target touch display device 102F has no available slots for the active input device, then the active input device may send one or more requests to the target touch display device 102F for a slot.

In some implementations, the controller 102F may be configured to determine a priority of different active input devices to be assigned pairing slots of the target touch display device 102F. The priority may be determined in any suitable manner based on any suitable characteristic of the active input devices. In one example, the priority may be based on position and/or motion characteristics of the different active input device that are paired or want to be paired with the target touch display device 102F. For example, an active input device that is requesting to be paired with the target touch display device 102F may be given priority over an active input device that is already paired with the target touch display device 102F, but is no longer proximate to the target touch sensor 120F. In another example, an active input device positioned in a central region of the target touch sensor 120F may be prioritized over another active input device positioned in a border region of the target touch sensor 120F. For example, the centrally-located active input device may be prioritized because it is presumed that the centrally-located active input device is less likely to leave the target touch display device 102F.

As used herein, "controller" means physical data-storage and processing circuit(s) and/or other hardware programmed with instructions to perform specialized computing operations. It is to be understood that two or more different circuits and/or other controllers may share hardware components. For example, the same integrated circuit may be part of two or more different controllers programmed to perform different functions.

Figure 2:
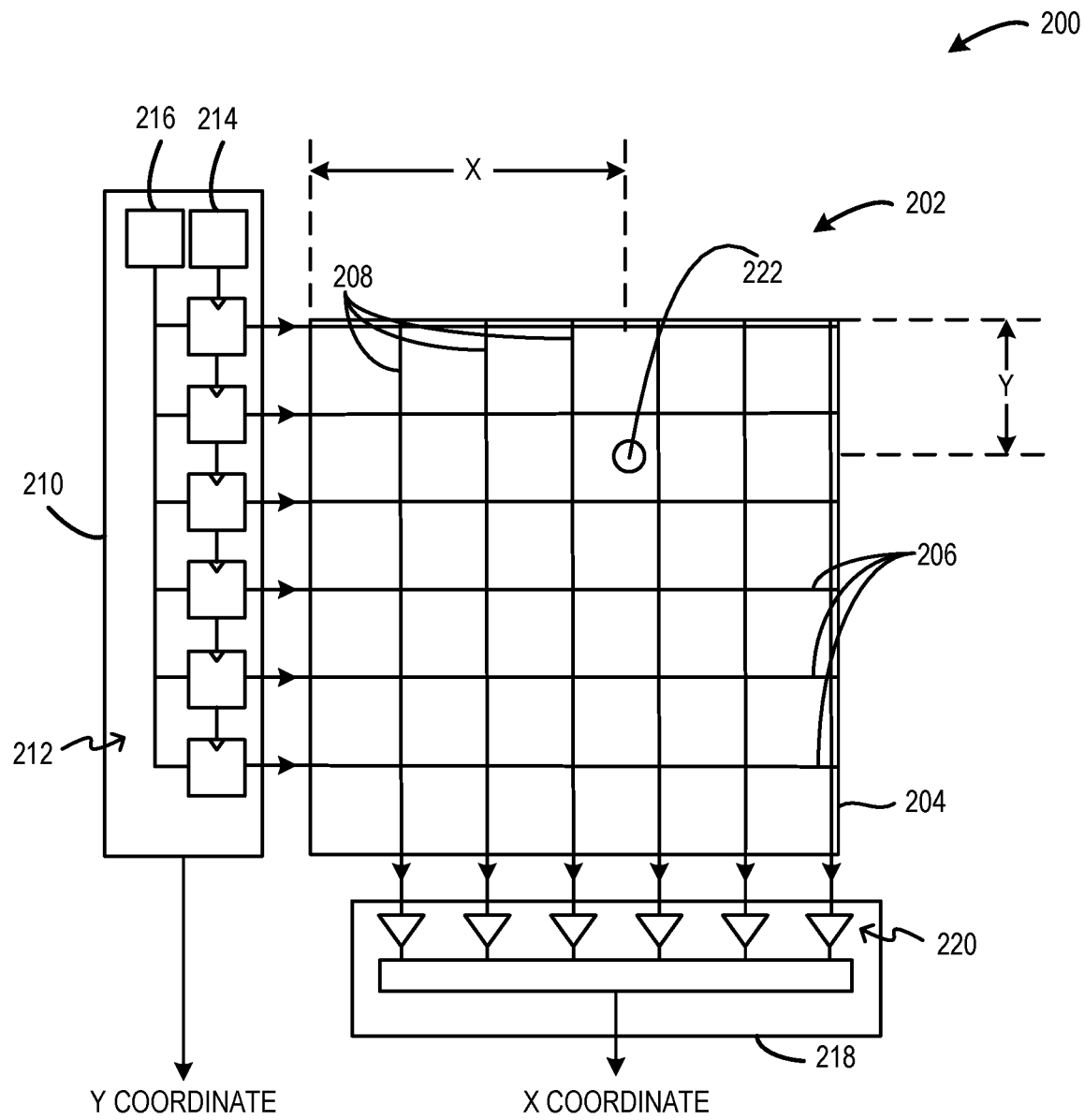
FIG. 2 shows a touch sensor that may be implemented in any of the touch display devices of FIG. 1.

FIG. 2 shows a depiction of a touch sensor 200 and its underlying touch-sensing architecture. The touch sensor 200 may be included in any suitable touch sensing device including, but not limited to, each of the plurality of touch display devices 102 of the touch display system 100 of FIG. 1. For example, the touch sensor 200 may be representative of touch sensor 120 of FIG. 1. The touch sensor 200 includes an electrode matrix 202 arranged planarly relative to a display subsystem (e.g., display subsystem 806 of FIG. 8) of the touch display device. Typically, this involves the electrode matrix 202 being arranged over, or at some depth within, the display subsystem. Also, the electrode matrix 202 is typically arranged parallel (or nearly so) to the display subsystem, though other orientations are possible. This disclosure further contemplates non-display implementations, such as a tiled configuration of multiple touch panel devices that do not include displays.

The electrode matrix 202 includes a series of rows 206 (e.g., row electrodes) and a series of columns 208 (e.g., column electrodes) arranged on a sensory surface 204. The electrode matrix 202 may include any number N of rows 206 and any number M of columns 208. Further, although it is customary to have the rows 206 aligned horizontally and the columns 208 aligned vertically, this aspect is in no way necessary: indeed, the terms 'row' and 'column' may be exchanged everywhere in this description. For example, the term row and column does not denote a global orientation but rather denotes the orientation of the electrodes with respect to one another. The rows 206 of the electrode matrix 202 are sequentially electrically excited and the columns 208 of the electrode matrix 202 are scanned to pick up an incoming signal for downstream touch sensing operations, discussed in greater detail herein.

The touch sensor 200 is configured to sense passive or active touch inputs at or near the input surface 204 of the electrode matrix 202. The touch sensor 200 includes a drive subsystem 210 and a receive subsystem 218 to effect such touch sensing functionality. In particular, these subsystems serve to (1) influence electrical conditions on the electrode matrix 202 (e.g., by driving row electrodes with voltage waveforms) and (2) respond to and interpret electrical conditions on the electrode matrix 202 (e.g., with various circuitry attached to column electrodes).

The drive subsystem 210 electrically couples to the rows 206 and is configured to scan, over the course of a "touch sensing frame," all of the rows of the electrode matrix 202. The scanning, or driving, typically occurs row-by-row, one row at a time. In many cases, the scanning is performed serially from the top to the bottom of the electrode matrix 202, or vice versa. In some cases, rather than individual scanning of row lines, two or more rows may be driven at the same time, but in an overall serial manner (meaning only one row, or a relatively small number of rows, is excited at a given time). Operation of the drive subsystem 210 and row electrodes 206 may be variously referred to herein as "driving," "scanning," "stimulating," or "exciting" the row electrodes 206. In each case, this refers to applying a voltage waveform or other electrical signal that induces or varies electrical conditions on the electrode being driven, stimulated, etc.

The drive subsystem 210 may include a row counter 212 in the form of an N-bit shift register with outputs driving each of N rows 206. The row counter 212 may be clocked by row-driver clock 214. The row counter 212 can include a blanking input to temporarily force all output values to zero independent of the values stored. Excitation of one or many rows may be provided by filling the row counter 212 with ones at every output to be excited, and zeroes elsewhere, and then toggling the blanking signal with the desired modulation from modulation clock 216. In the illustrated implementation, the output voltage may take on only two values, corresponding to the one or zero held in each bit of the row counter; in other implementation, the output voltage may take on a greater range of values, to reduce the harmonic content of the output waveforms, or to decrease radiated emissions, for example.

The description above of the row counter 212 should not be construed as limiting in any way, for numerous alternative implementations are equally contemplated. For instance, the row counter 212 may be implemented as a micro-coded state machine within a field-programmable gated array (FPGA) with the touch-sensing logic described herein. In other implementations, the row counter 212 may take the form of a register within a microprocessor, or as a data structure held in computer memory associated with the microprocessor. In these and other implementations, the row counter may take on non-negative integer values—e.g., 0, 1, . . . N.

The receive subsystem 218 includes a plurality of sensing amplifiers 220 electrically coupled to the plurality of columns 208. The plurality of sensing amplifiers 220 are configured to receive drive signals applied to the row electrodes 206 via the column electrodes 208. In one example, the receive subsystem 218 may be implemented as a micro-coded state machine. However, numerous types of receive circuitry may be contemplated.

In the depicted example, the drive subsystem 210 applies a drive signal to each row 206 in sequence. During a period in which the sensory surface 204 is untouched, none of the column amplifiers registers an above-threshold output. However, when the user places touch input source (e.g., a fingertip, an active stylus) on or near the sensory surface 204 at a touch point 222, the touch input source capacitively couples one or more rows 206 intersecting the touch point 222 to one or more columns 208 also intersecting the touch point 222. The capacitive coupling induces an above-threshold signal from the column amplifiers 220 associated with the column electrodes 208 beneath (i.e., adjacent) the touch point 222, which provides sensing of the touch point 222. The receive subsystem 218 returns, as the X coordinate of the touch point, the numeric value of the column providing the greatest signal. The receive subsystem 218 also determines which row was being excited when the greatest signal was received, and returns the numeric value of that row as the Y coordinate of the touch point 222.

In the above description, touch inputs are identified when a given column signal goes "above threshold." Typically this determination is made in the context of a correlation operation. In many implementations, there is a design-time determination made as to the exact character (amplitude, frequency, etc.) of a signal that will be received into the column receive circuitry in the event of a touch. In addition, predictions may be made about the likely noise that will also be received into the column receive circuitry at runtime (e.g., noise from power supply operation, operation of the LCD panel, etc.).

Being thus equipped with a fairly accurate approximation of what a touch-induced inbound signal looks like in the presence of predicted noise, the receive circuitry, in the event of an arbitrary inbound signal received at runtime, can run a correlation operation on that inbound signal, which essentially assesses the degree to which the inbound signal resembles what would be expected in the event of a touch. The correlation operation is "tuned" to account for the drive signal being used to excite the rows, in the sense that it typically uses a reference signal for the correlation that is based upon that drive signal (in some cases, the reference signal is identical to the drive signal). In any event, when the resemblance exceeds a threshold (i.e., the inbound signal highly correlates with what would be expected in the event of a finger touch), then the system affirmatively registers a touch occurring on that column. And as indicated above, the time at which it is received indicates the Y coordinate of the touch. It will be further appreciated that interpolation may be performed on both the X and Y coordinates to increase resolution.

Other measurements may be performed on electrode matrix 202 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

Electrode matrix 202 may be repeatedly scanned at a frame rate (e.g., 60 Hz, 120 Hz) to persistently detect touch input, where a complete scan of a frame comprises applying an excitation sequence to each row 206, and for each driven row, collecting output from all of the receive columns 208. However, in other examples, a complete scan of a frame may be a scan of a desired subset, and not all, of one or both of rows 206 and columns 208.

As discussed above, a touch display device may be configured to communicate with an active input device via a touch sensor of the touch display device. Specifically, an electrostatic channel may be established between one or more rows 206 and a conductive element (e.g., an electrode tip) of an active input device, along which data may be transmitted. In one example, communication via the electrostatic channel is initiated by the transmission of a synchronization pattern from electrode matrix 202 to the active input device. The synchronization pattern may enable the touch display device and the active input device to obtain a shared sense of time. The synchronization pattern may be transmitted via multiple transmit rows 206 so that the active input device can receive the pattern regardless of its position relative to the electrode matrix 202.

The shared sense of time may facilitate the correlation of a time at which the active input device detects an excitation sequence or other signal transmitted on transmit rows 206 to a location in the electrode matrix 202, as the synchronization pattern may yield an indication of the order in which transmit rows 206 are driven. Such correlation may enable the active input device to determine at least one coordinate (e.g., y-coordinate) relative to the electrode matrix 202, which may be transmitted back to the touch sensor 200 (e.g., via the electrostatic channel) or to an associated display device via a different communication protocol (e.g., radio, Bluetooth). To determine a second coordinate (e.g., x-coordinate) of the active input device, all transmit rows 206 may be held at a constant voltage, and the active input device may transmit a time-varying voltage to the electrode matrix 202, which may sequentially measure currents resulting from a voltage of the active input device in each receive column 208 to ascertain the second coordinate.

The above described synchronization, row-drive, and input device-drive operations may be part of a touch sensing frame that is repeated by the touch display device. In particular, the touch sensing frame is divided into a plurality of subframes. In one example, the plurality of subframes include a synchronization subframe, a row-drive subframe, and an input device-drive frame. In some implementations, the input device-drive frame may be further divided into a plurality of designated slots that can be assigned to different paired active input devices. In one example, the input-device drive frame is divide into three slots that can be associated with three different active input devices. In other implementations, the touch sensing frame may be divided differently and/or may include additional subframes.

A duration of the touch sensing frame may be determined based on a frame rate of the touch display device—i.e., the faster the frame rate the shorter the duration. The limited duration of the frame further limits the number of slots in which the input device-drive subframe can be divided. In other words, the duration of the touch sensing frame may be a determining factor of a number of active input devices that can be paired with the touch display device at one time.

In some implementations, the plurality of touch display devices 102 of the tiled touch display system 100 of FIG. 1 may be phase-locked such that the plurality of display devices 102 have a shared sense of timing and/or a synchronized touch sensor excitation sequence. In some implementations, rows near the boundary between two touch sensors are driven close in time to one another. For example, for an upper matrix positioned directly above a lower matrix, the bottom ten rows (or any other number of rows) of the upper matrix and the top ten rows of the lower matrix might be driven during the same short interval. This may reduce the risk of missed or duplicated inputs within a touch frame, and can reduce an active stylus's vulnerability to time-varying noise. In more specific implementations, near-boundary rows can be scanned close in time using opposite direction scan patterns for adjacent matrices. In the above example, rows in the upper matrix could be scanned bottom-to-top and rows in the lower matrix could be scanned top-to-bottom.

The configurations illustrated above enable various methods for operating a source touch display device to negotiate pairing of an active input device with a target touch display device. Accordingly, some such methods are now described, by way of example, with continued reference to the above configurations. It will be understood, however, that these methods, and others fully within the scope of the present disclosure, may be enabled via other configurations as well.

Figure 3:
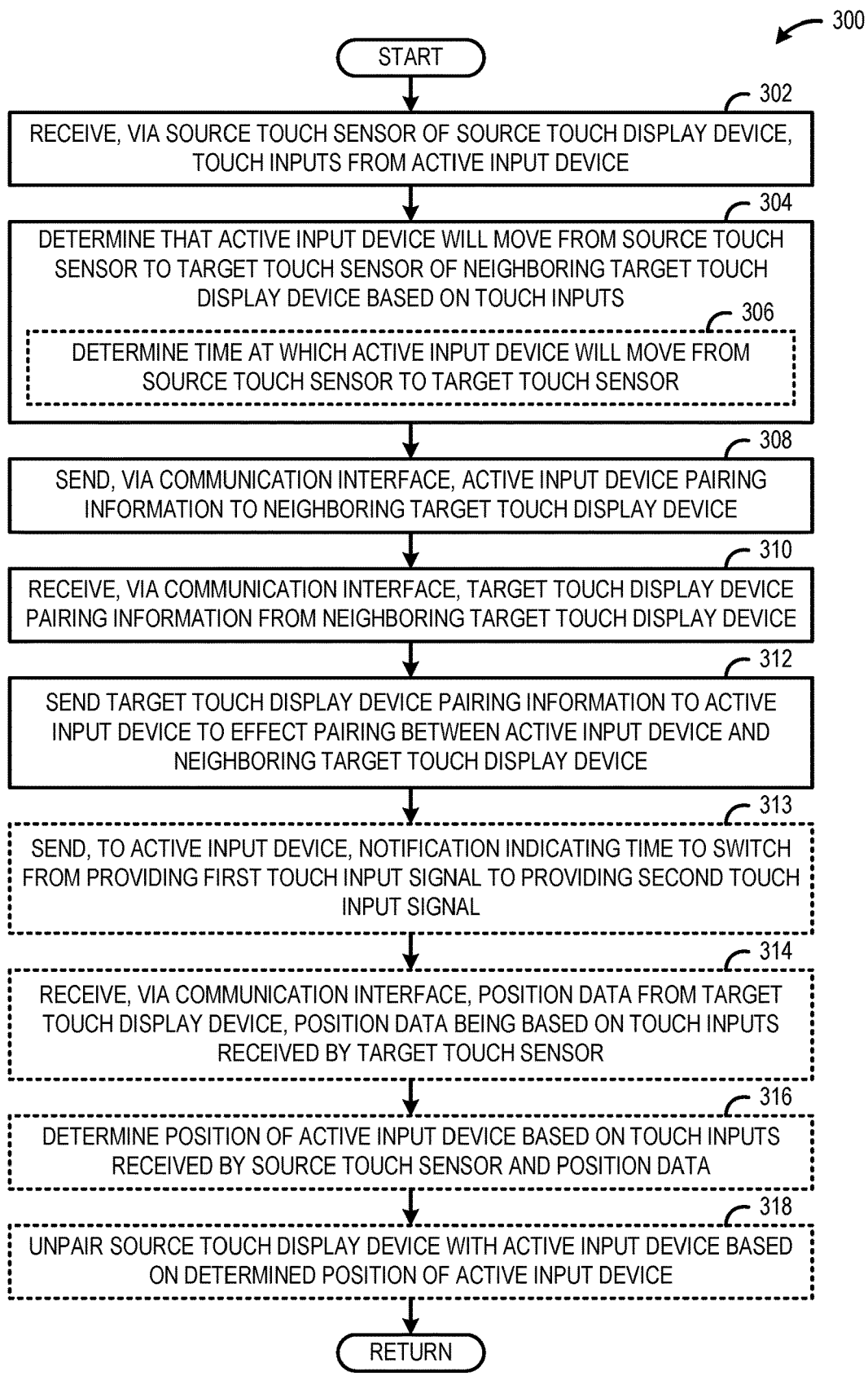
FIG. 3 shows a method for operating a touch display device.

FIG. 3 shows an example method 300 of operating a source touch display device to negotiate pairing of an active input device with a target touch display device on behalf of the active input device. For example, the method 300 may be performed by any of the plurality of touch display devices 102 of FIG. 1 as well as a computing system 800 of FIG. 8. In general, the method 300 may be performed by any suitable touch sensing device arranged in a tiled touch display system with one or more communicatively coupled target touch display devices.

At 302, the method 300 includes receiving, via a source touch sensor of a source touch display device, touch inputs from an active input device. For example, the touch input may indicate a position (e.g., X, Y coordinates) of the active input device relative to an electrode matrix of the source touch sensor.

At 304, the method 300 includes determining that the active input device will likely move from the source touch sensor to a target touch sensor of a target touch display device based on the touch inputs. For example, such a determination may be made based on position and motion characteristics (e.g., speed, acceleration, direction) of the active input device.

In some implementations, such a determination may be based on the determined position of the active input device being within a threshold distance of a boundary of the source touch sensor. For example, whenever an active input device is positioned along the outer edge of the touch sensor, the computing device may assume that the active input device is moving to a target touch display device. Non-limiting examples of threshold distances and boundaries for initiating pairing and unpairing are described in further detail below with reference to FIGS. 6 and 7A-7B.

In some implementations, at 306, the method 300 optionally may include determining a time at which the active input device will likely move from the source touch sensor to the target touch sensor. For example, the time may be estimated based on one or more motion characteristics of the active input device that are derived from the touch inputs. Non-limiting examples of such motion characteristics include a position, speed, and direction of the active input device.

At 308, the method 300 includes sending, via a communication interface, active input device pairing information to the target touch display device. The source touch display device may know and provide the active input device pairing information, because the source touch display device is already paired with the active input device. The active input device pairing information may include any suitable information about the active input device. In one example, the active input device pairing information includes an identifier of the active input device. In another example, the active input device pairing information includes a touch input signal pattern used by the active input device to provide touch inputs.

In some implementations, the source touch display device sends the active input device pairing information in response to determining that the active input device will likely move from the source touch sensor to the target touch sensor of the target touch display device.

At 310, the method 300 includes receiving, via the communication interface, target touch display device pairing information from the target touch display device. The target touch display device pairing information may include any suitable information about the target touch display device. For example, the target touch display device pairing information may include one or more of an identifier of the target touch display device, an indication of a touch input signal sequence to be used by the active input device to provide touch input to the target touch display device, and an available slot in a touch input frame to provide the signal sequence to the target touch display device.

At 312, the method 300 includes sending the target touch display device pairing information to the active input device to effect a pairing between the active input device and the target touch display device.

In one example, the source touch display device sends the target touch display device pairing information to the active input device via a wireless radio channel. In another example, the source touch display device sends the target touch display device pairing information to the active input device via an electrostatic channel formed via the source touch sensor.

In one example, the source touch display device sends the target touch display device pairing information to the active input device prior to the active input device moving from the source touch sensor, and the active input device pairs with the target touch display device prior to the active input device moving to the target touch sensor. If the active input device successfully pairs with the target touch display device, the active input device can seamlessly move to the target touch sensor without any break or latency in touch sensing and/or ink tracing on the target touch display device.

In some implementations, the active input device provides different touch input signals to the source touch display device and the target touch display device. For example, the touch input signals may differ by having one or more of a different touch input signal sequence and a timing (e.g., the signal is sent during different slots of a touch sensing frame). In some such implementations, at 313, the method 300 optionally may include sending, to the active input device, a notification indicating the time to switch from providing a first touch input signal to providing a second, different touch input signal. The time corresponds to the time (e.g., determined at step 306) at which the active input device moves from the source touch sensor to the target touch sensor. By switching touch input signals at the precise time, touch input signal interference may be reduced, and correspondingly any breaks and/or latency in touch input may be reduced.

In some implementations, the source and target touch display devices are configured to determine a position of the active input device via interpolation of multiple touch input signals received by neighboring column electrodes of the touch sensors (i.e., similar to a single sensor implementation in which a certain number of columns, say 3-5, on either side of a column registering the highest signal are used for fine position interpolation). In particular, when the active input device moves from one touch display device to a neighboring touch display device, position data received by column electrodes adjacent the boundary of each touch display device are used for interpolation to determine the position of the active input device. Accordingly, in some implementations, at 314, the method 300 optionally may include receiving, via the communication interface, position data from the target touch display device. The position data is based on touch inputs received by the target touch sensor. For example, when the active input device is near the left boundary of the target touch display device (e.g., column N), both of the source touch display device and the target touch display device need the received touch input signals from columns N−2, N−1, N+1 and N+2 for fine position interpolation, but columns N+1 and N+2 do not exist on the source touch display device display and columns N−1 and N−2 do not exist on the target touch display device. As such, the missing position data may be exchanged between the touch display devices via the communication interface.

In some implementations, at 316, the method 300 optionally may include determining a position of the active input device based on touch inputs received by the source touch sensor and the position data. For example, when the active input device is positioned at column N of the target touch display device, the source touch display device interpolates the fine position based on measured touch input signal of column N−1 and N−2 and position data received from the target touch display device that corresponds to touch input signal of column N, N+1, and N+2.

In some implementations, at 318, the method 300 optionally may include unpairing the source touch display device with the active input device based on the determined position of the active input device. For example, the source touch display device may unpair with the active input device based on recognizing that position of the active input device is beyond a boundary of the source touch sensor. In one example, such a determination may be made based on not receiving a touch input signal from the active input device for greater than a threshold duration. In another example, such a determination may be made based on receiving an indication that the active input device is on the target touch sensor of the target touch display device. In another example, such a determination may be made based on receiving an indication that the active input device has traveled greater than a threshold distance away from the source touch display device on the target touch sensor.

Figure 4:
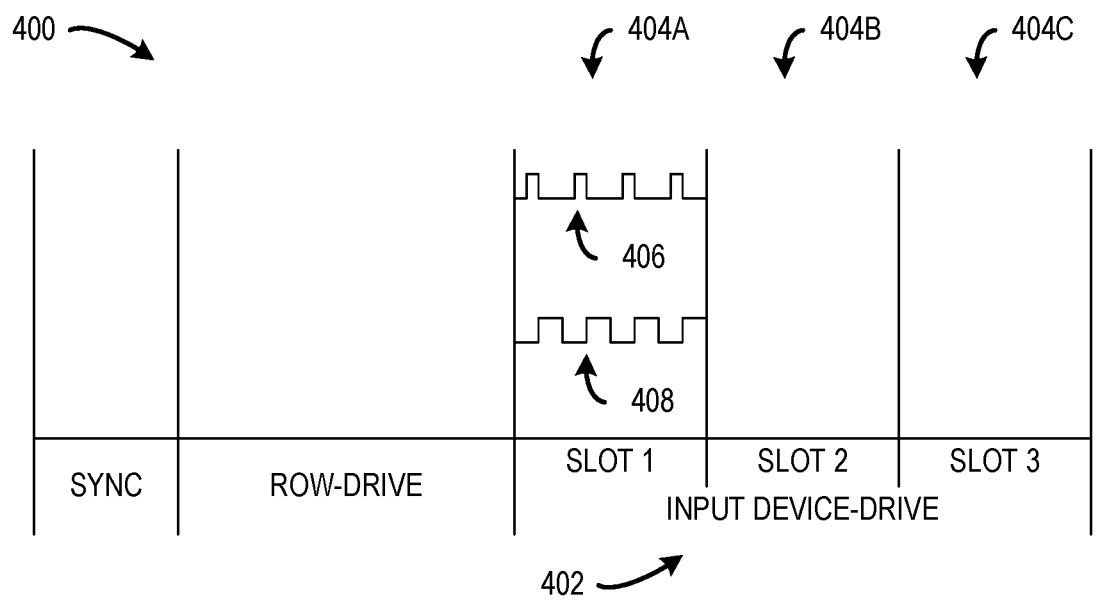
FIG. 4 shows a scenario in which an active input device provides two different touch input signal sequences at the same time in the same time slot of a touch input frame.

In some implementations, the active input device is configured to provide a plurality of different touch input signal sequences that may be distinguished by different touch display devices. In FIG. 4, a touch sensing frame 400 is divided into a plurality of subframes. In particular, the plurality of subframes includes an input device-drive subframe 402 during which different active input devices can provide touch input signal sequences that are recognized as touch inputs by one or more touch display devices. In the depicted example, the input device-drive subframe 402 is divided into three slots 404 (e.g., 404A, 404B, 404C).

In this example, an active input device is paired with both a source touch display device and a target touch display device. The active input device provides a first touch input signal sequence 406 and a second touch input signal sequence 408 in the first slot 404A. In some cases, the different touch input signal sequences may be orthogonal relative to one another in order to reduce signal interference. Based on the respective pairing processes, the source touch display device knows to look for the first touch input signal sequence 406 in the first slot 404A and the target touch display device knows to look for the second touch input signal sequence 408 in the first slot 404A. In one example, such slot allocation may be defined during the pairing process of the active input device with the different touch display devices. In another example, a particular active input device may have a predetermined slot allocation.

In this example, the active input device includes circuitry configured to provide both of the first and second touch input signal sequences at the same time. In another example, such an active input device could provide the first touch input signal sequence 406 and the second touch input signal sequence 408 in different slots of the input device-drive subframe.

Figure 5:
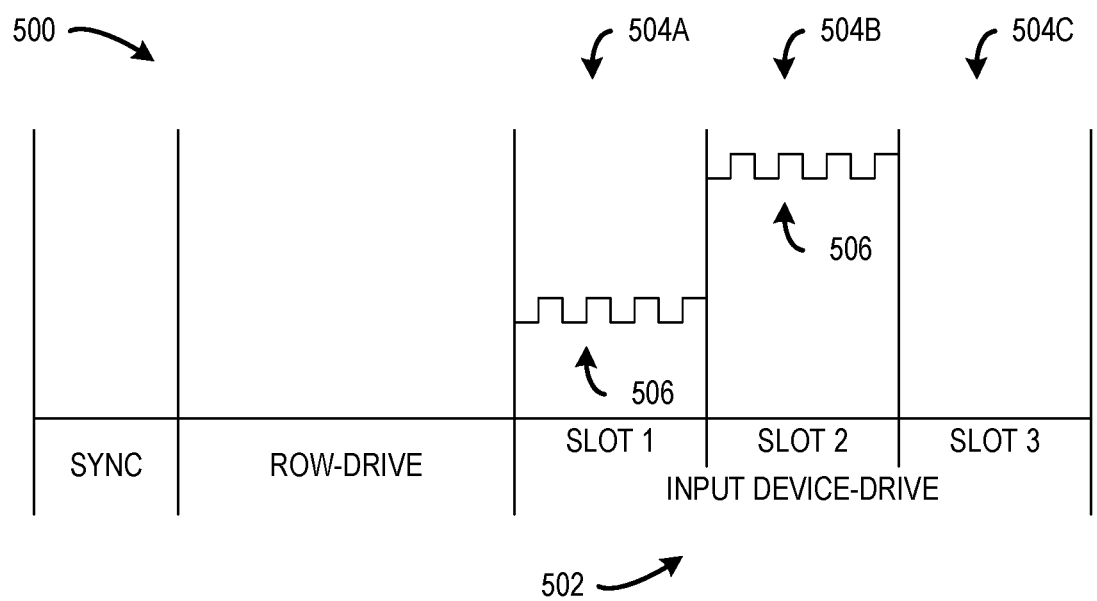
FIG. 5 shows a scenario in which an active input device provides two different touch input signal sequences in different time slots of a touch input frame.

In some implementations, the active input device is configured to provide a touch input signal sequence that may be recognized by different touch display devices. In FIG. 5, a touch sensing frame 500 is divided into a plurality of subframes. In particular, the plurality of subframes includes an input device-drive subframe 502 during which different active input devices can provide touch input signal sequences that are recognized as touch inputs by one or more touch display devices. In the depicted example, the input device-drive subframe 502 is divided into three slots 504 (e.g., 504A, 504B, 504C).

In this example, an active input device is paired with both a source touch display device and a target touch display device. The active input device provides a first touch input signal sequence 506 in the first slot 504A. Based on the respective pairing processes, the source and target touch display devices know to look for the first touch input signal sequence 506 in the first slot 504A. In one example, such slot allocation may be defined during the pairing process of the active input device with the source touch display device. In another example, a particular active input device may have a predetermined slot allocation.

In this example, the active input device includes circuitry configured to provide just the first touch input signal sequence. Further, the source and target touch display devices include circuitry configured to recognize first touch input signal sequence. Accordingly, different slots are allocated for different pairings. Moreover, in such a scenario, as part of the pairing negotiation process, the different touch display devices may know or find out the touch sensing capabilities of the other touch display devices, and such information may be used to determine which slots and signal sequences are to be used by the active input device to provide touch inputs to the different touch display devices.

Figure 6:
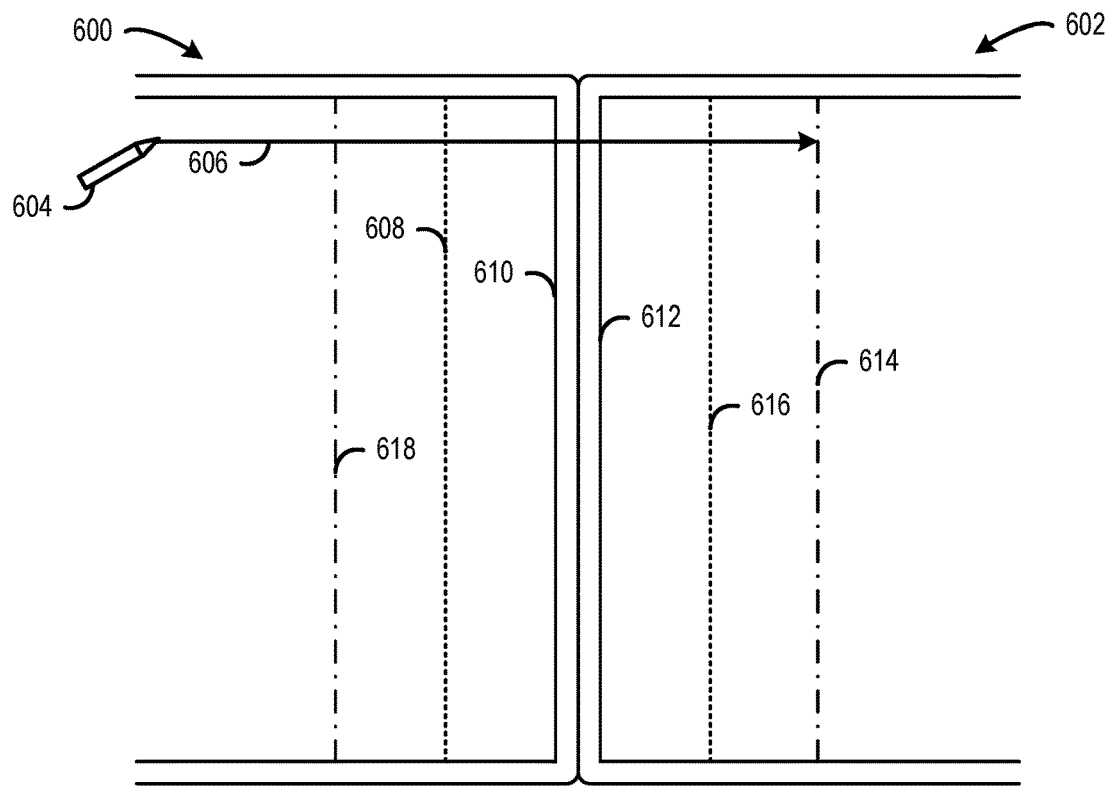
FIG. 6 shows different threshold distances relative to touch sensor boundaries of touch display devices that trigger pairing and unpairing of active input devices.

In some implementations, a touch display device may initiate pairing and unpairing operations based on a position of an active input device relative to one or more touch sensors. FIG. 6 shows an example implementation in which a source touch display device 600 and a target touch display device 602 include respective threshold distances that trigger pairing and unpairing. In particular, as an active input device 604 moves along a path 606 from the source touch display device 600 to the target touch display device 602, the source touch display device 600 initiates pairing negotiations with the target touch display device 602 on behalf of the active input device 604 based on the active input device crossing a pairing threshold distance 608 relative to the edge 610 of the source touch sensor. As such, the active input device 604 can be paired with the target touch sensor 602 when the active input device crosses the edge 612 of the target touch sensor. Furthermore, the target touch display device 602 sends a notification to the source touch display device 600 based on the active input device 604 crossing an unpairing threshold distance 614. The source touch display device 600 unpairs with the active input device 604 based on receiving the notification.

Likewise, the target touch display device 602 initiates pairing and unpairing based on a pairing threshold distance 616 and an unpairing threshold distance 618 when the active input device 604 moves from the target touch display device 602 to the source touch display device 600.

The pairing and unpairing threshold distances may be set to any suitable distances from the edges of the touch sensors. In general, the unpairing threshold distance may be further away from the edge of the touch sensor than the pairing threshold distance, because the active input device is more likely to remain on the particular touch display device (e.g., the target touch display device) once the active input device has crossed that threshold. Although other threshold distance arrangements may be contemplated herein.

Figure 7A:
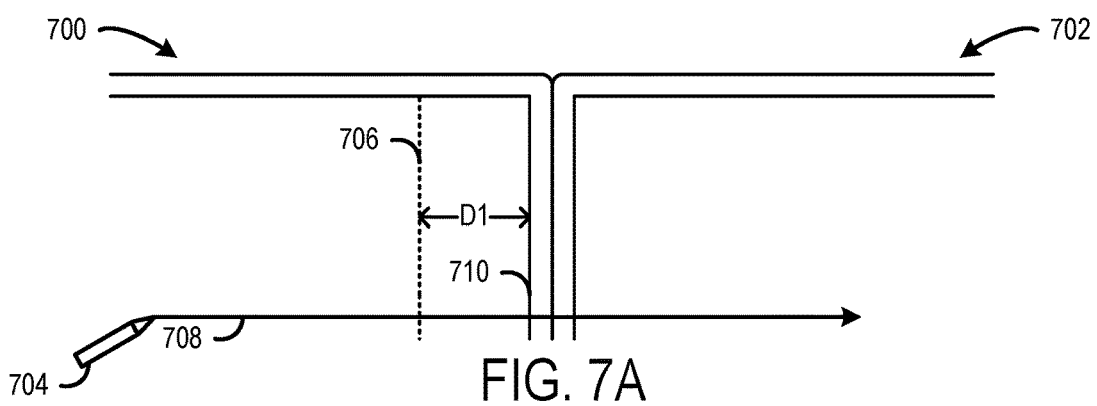
FIG. 7A-7B show different examples of a threshold distance that is dynamically determined based on one or more motion characteristics of an active input device.
Figure 7B:
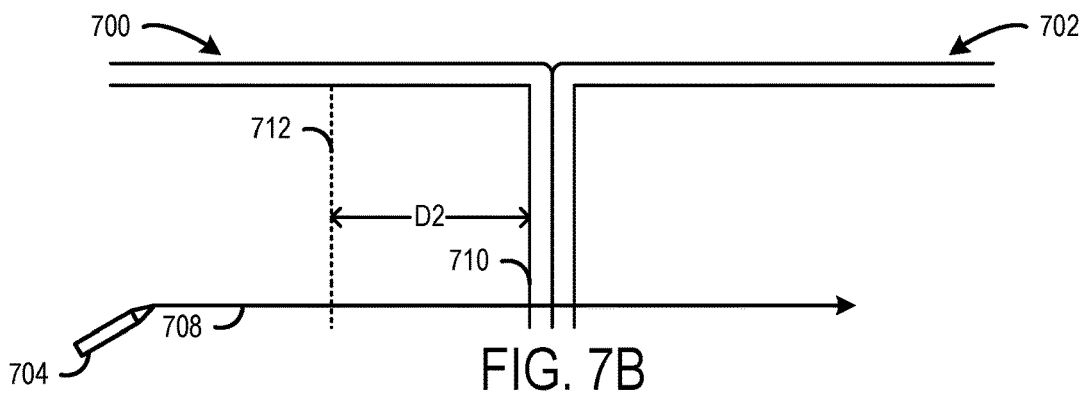

In the above described implementation, the threshold distances are predetermined. In other implementations, one or more of the pairing and unpairing threshold distances may be dynamically determined based on one or more motion characteristics of an active input device. FIGS. 7A and 7B show an example scenario in which a source touch display device 700 dynamically changes a pairing threshold distance 706 based on a speed of an active input device 704. In FIG. 7A, the active input device 704 is moving along a path 708 at a first speed towards an edge 710 of the source touch sensor. The source touch display device 700 determines the pairing threshold distance 706 based on the speed and the direction of the active input device 704. For example, the pairing threshold distance 706 may be set such that the active input device 704 is paired with a target touch display device 702 by the time that the active input device reaches the edge 710 if the active input device maintains the same speed along the path 708.

In FIG. 7B the active input device 704 is moving along the path 708 at a second speed towards the edge 710 of the source touch sensor. The second speed is greater than the first speed of the active input device 704 in FIG. 7A. The source touch display device 700 determines the threshold distance 712 based on the speed and the direction of the active input device 704. In particular, because the active input device 704 is traveling at a greater speed and in the same direction along path 708 relative to the speed of FIG. 7A, the pairing threshold distance 712 is greater than the pairing threshold distance 706 (i.e., D2>D1). The greater distance allows enough time for the active input device 704 to be paired with the target touch display device 702 by the time the active input device 704 reaches the edge 710 of the target touch sensor.

The pairing threshold distances may be dynamically determined based on any suitable motion characteristics of the active input device. Non-limiting examples of such motion characteristics include direction, speed, acceleration, and a duration in which the active input device is providing touch input to a touch sensor.

Figure 8:
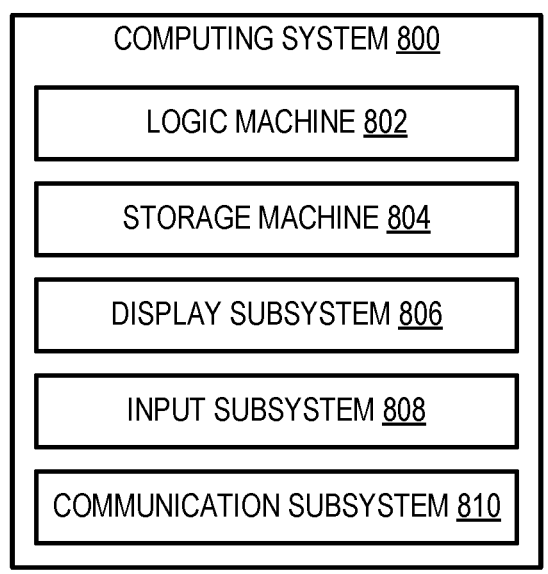
FIG. 8 shows a computing system.

FIG. 8 schematically shows a non-limiting implementation of a computing system 800 that can enact one or more of the methods and processes described above. Computing system 800 is shown in simplified form. Computing system 800 may take the form of one or more display devices, active styluses, personal computers, server computers, tablet computers, home-entertainment computers, network computing devices, gaming devices, mobile computing devices, mobile communication devices (e.g., smart phone), and/or other computing devices. For example, computing system 800 may represent any of the plurality of touch display device 102 of FIG. 1.

Computing system 800 includes a logic machine 802 and a storage machine 804. Computing system 800 may optionally include a display subsystem 806, input subsystem 808, communication subsystem 810, and/or other components not shown in FIG. 800.

Logic machine 802 includes one or more physical devices configured to execute instructions. For example, logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 802 may include one or more processors configured to execute software instructions. Additionally or alternatively, Logic machine 802 may include one or more hardware or firmware logic machines configured to execute hardware or firmware instructions. Processors of logic machine 802 may be single-core or multi-core, and the instructions executed thereon may be configured for sequential, parallel, and/or distributed processing. Individual components of logic machine 802 optionally may be distributed among two or more separate devices, which may be remotely located and/or configured for coordinated processing. Aspects of logic machine 802 may be virtualized and executed by remotely accessible, networked computing devices configured in a cloud-computing configuration.

Storage machine 804 includes one or more physical devices configured to hold instructions executable by logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc), semiconductor memory (e.g., RAM, EPROM, EEPROM), and/or magnetic memory (e.g., hard-disk drive, floppy-disk drive, tape drive, MRAM), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by storage machine 804, and thus transform the state of storage machine 804, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, communication subsystem 810 may be configured for communication via a wireless telephone network, or a wired or wireless local- or wide-area network. In some embodiments, communication subsystem 810 may allow computing system 800 to send and/or receive messages to and/or from other devices via a network such as the Internet.

The present disclosure may be further characterized as follows. In one example, a source touch display device is disclosed. The source touch display device includes (1) a communication interface configured to communicatively couple the source touch display device with a target touch display device; (2) a source touch sensor; and (3) a controller. The controller is configured to (1) receive, via the source touch sensor, touch inputs from an active input device; (2) determine that the active input device will likely move from the source touch sensor to a target touch sensor of the target touch display device based on the touch inputs; (3) send, via the communication interface, active input device pairing information to the target touch display device; (4) receive, via the communication interface, target touch display device pairing information from the target touch display device; and (5) send the target touch display device pairing information to the active input device to effect a pairing between the active input device and the target touch display device.

In this example, the target touch display device pairing information may include one or more of an identifier of the target touch display device, an indication of a touch input signal sequence to be used by the active input device to provide touch input to the target touch display device, and an available slot in a touch input frame to provide the signal sequence to the target touch display device.

In this example, the active input device pairing information may include an identifier of the active input device.

In this example, the active input device may be paired with the target touch display device prior to the active input device moving to the target touch sensor.

In this example, the active input device may be configured to provide a plurality of different touch input signal sequences to provide touch inputs to different touch input devices, wherein the active input device uses a first touch input signal sequence to provide touch inputs to the source touch sensor, wherein the target touch display device pairing information includes an indication of a second touch input signal sequence orthogonal to the first touch input signal sequence, and wherein the second touch input signal sequence is usable by the active input device to provide touch inputs to the target touch sensor. Still further, the active input device may be configured to provide the first touch input signal sequence and the second touch input signal sequence at the same time.

In this example, the active input device may be configured to provide a touch input signal sequence during a first time slot of a touch input frame that is recognized by the source touch display device, and wherein the active input device may be configured to provide the touch input signal sequence of a second time slot in the touch input frame that is recognized by the target touch display device.

In this example, the active input device may be configured to provide a first touch input signal to the source touch display device and provide a second touch input signal different than the first touch input signal to the target touch display device, and wherein the controller may be configured to 1) determine a time at which the active input device will likely move from the source touch sensor to the target touch sensor, and 2) send, to the active input device, a notification indicating the time to switch from providing the first touch input signal to providing the second touch input signal.

In this example, the controller may be configured to unpair the source touch display device with the active input device based on recognizing that the active input device has moved to the target touch sensor.

In this example, the controller may be configured to: (1) receive, via the communication interface, position data from the target touch display device, the position data being based on touch inputs received by the target touch sensor from the active input device; (2) determine a position of the active input device based on touch inputs received by the source touch sensor and the position data; and (3) unpair the source touch display device with the active input device based on recognizing that the position of the active input device is beyond a boundary of the source touch sensor and greater than a threshold distance from a boundary of the target touch sensor.

In this example, the active input device pairing information may be sent to the target touch display device based on a determined position of the active input device being within a threshold distance of a boundary of the source touch sensor. The threshold distance may be dynamically determined based at least in part on a speed of the active input device.

In another example, the description encompasses a method for operating a source touch display device. The method includes (1) receiving, via a source touch sensor of the source touch display device, touch inputs from an active input device; (2) determining that the active input device will likely move from the source touch sensor to a target touch sensor of a target touch display device based on the touch inputs; (3) sending, via a communication interface, active input device pairing information to the target touch display device; (4) receiving, via the communication interface, target touch display device pairing information from the target touch display device; and (5) sending the target touch display device pairing information to the active input device to effect a pairing between the active input device and the target touch display device.

In this example, the method may also include unpairing the source touch display device with the active input device based on recognizing that the active input device has moved to the target touch sensor.

In this example, the method may also include (1) receiving, via the communication interface, position data from the target touch display device, the position data being based on touch inputs received by the target touch sensor; (2) determining a position of the active input device based on touch inputs received by the source touch sensor and the position data; and (3) unpairing the source touch display device with the active input device based on recognizing that the position of the active input device is beyond a boundary of the source touch sensor and greater than a threshold distance from a boundary of the target touch sensor.

In this example, the method may also include (1) determining a time at which the active input device will likely move from the source touch sensor to the target touch sensor; and (2) sending, to the active input device, a notification indicating the time to switch from providing a first touch input signal to providing a second touch input signal.

In this example, the active input device pairing information may be sent to the target touch display device based on a determined position of the active input device being within a threshold distance of a boundary of the source touch sensor.

In this example, the active input device may be paired with the target touch display device prior to the active input device moving to the target touch sensor.

In this example, the active input device may be configured to provide a plurality of different touch input signal sequences to provide touch input to different touch input devices, wherein the active input device uses a first touch input signal sequence to provide touch inputs to the source touch sensor, wherein the target touch display device pairing information includes an indication of a second touch input signal sequence orthogonal to the first touch input signal sequence, and wherein the second touch input signal sequence is usable by the active input device to provide touch inputs to the target touch sensor.

In still another example, a source touch display device is provided. The source touch display device includes (1) a communication configured to communicatively couple the source touch display device with a target touch display device; (2) a touch sensor; and (3) a controller. The controller is configured to (1) receive, via the source touch sensor, touch inputs from an active input device; (2) determine that the active input device will likely move from the source touch sensor to a target touch sensor of the target touch display device based on the touch inputs; (3) in response to such determining, send, via the communication interface, an identifier of the active input device to the target touch display device; (4) receive, via the communication interface, pairing information from the target touch display device, the pairing information including one or more of an identifier of the target touch display device, an indication of a touch input signal sequence to be used by the active input device to provide touch inputs to the target touch display device, and an available slot in a touch input frame to provide the signal sequence to the target touch display device; and (5) prior to the active input device moving to the target touch sensor, send the pairing information to the active input device to effect a pairing between the active input device and the target touch display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A source touch display device comprising:
   a communication interface configured to communicatively couple the source touch display device with a target touch display device;
   a source touch sensor; and
   a controller configured to:
      receive active input device pairing information from an active input device,
      pair the source touch display with the active input device prior to the active input device moving to a target touch sensor based on the active input device pairing information,
      store the active input device pairing information in memory of the source touch display device;
      receive, via the source touch sensor, touch inputs from the active input device;
      determine that the active input device will likely move from the source touch sensor to the target touch sensor of the target touch display device based on the touch inputs;
      send, via the communication interface, the active input device pairing information to the target touch display device based on determining that the active input device will likely move from the source touch sensor to the target touch sensor and prior to the active input device leaving the source touch sensor;

receive, via the communication interface, target touch display device pairing information from the target touch display device; and
send the target touch display device pairing information to the active input device to effect a pairing between the active input device and the target touch display device.

2. The source touch display device of claim 1, wherein the target touch display device pairing information includes one or more of an identifier of the target touch display device, an indication of a touch input signal sequence to be used by the active input device to provide touch input to the target touch display device, and an available slot in a touch input frame to provide the signal sequence to the target touch display device.

3. The source touch display device of claim 1, wherein the active input device pairing information includes an identifier of the active input device.

4. The source touch display device of claim 1, wherein the active input device is configured to provide a plurality of different touch input signal sequences to provide touch inputs to different touch input devices, wherein the active input device uses a first touch input signal sequence to provide touch inputs to the source touch sensor, wherein the target touch display device pairing information includes an indication of a second touch input signal sequence orthogonal to the first touch input signal sequence, and wherein the second touch input signal sequence is usable by the active input device to provide touch inputs to the target touch sensor.

5. The source touch display device of claim 4, wherein the active input device is configured to provide the first touch input signal sequence and the second touch input signal sequence at the same time.

6. The source touch display device of claim 1, wherein the active input device is configured to provide a touch input signal sequence during a first time slot of a touch input frame that is recognized by the source touch display device, and wherein the active input device is configured to provide the touch input signal sequence of a second time slot in the touch input frame that is recognized by the target touch display device.

7. The source touch display device of claim 1, wherein the active input device is configured to provide a first touch input signal to the source touch display device and provide a second touch input signal different than the first touch input signal to the target touch display device, and wherein the controller is configured to 1) determine a time at which the active input device will likely move from the source touch sensor to the target touch sensor, and 2) send, to the active input device, a notification indicating the time to switch from providing the first touch input signal to providing the second touch input signal.

8. The source touch display device of claim 1, wherein the controller is configured to:
unpair the source touch display device with the active input device based on recognizing that the active input device has moved to the target touch sensor.

9. The source touch display device of claim 1, wherein the controller is configured to:
receive, via the communication interface, position data from the target touch display device, the position data being based on touch inputs received by the target touch sensor from the active input device;
determine a position of the active input device based on touch inputs received by the source touch sensor and the position data; and
unpair the source touch display device with the active input device based on recognizing that the position of the active input device is beyond a boundary of the source touch sensor and greater than a threshold distance from a boundary of the target touch sensor.

10. The source touch display device of claim 1, wherein the active input device pairing information is sent to the target touch display device based on a determined position of the active input device being within a threshold distance of a boundary of the source touch sensor.

11. The source touch display device of claim 10, wherein the threshold distance is dynamically determined based at least in part on a speed of the active input device.

12. A method for operating a source touch display device, the method comprising:
receiving active input device pairing information from an active input device,
pairing the source touch display with the active input device prior to the active input device moving to a target touch sensor based on the active input device pairing information,
storing the active input device pairing information in memory of the source touch display device;
receiving, via a source touch sensor of the source touch display device, touch inputs from the active input device;
determining that the active input device will likely move from the source touch sensor to the target touch sensor of a target touch display device based on the touch inputs;
sending, via a communication interface, the active input device pairing information to the target touch display device based on determining that the active input device will likely move from the source touch sensor to the target touch sensor and prior to the active input device leaving the source touch sensor;
receiving, via the communication interface, target touch display device pairing information from the target touch display device; and
sending the target touch display device pairing information to the active input device to effect a pairing between the active input device and the target touch display device.

13. The method of claim 12, further comprising:
unpairing the source touch display device with the active input device based on recognizing that the active input device has moved to the target touch sensor.

14. The method of claim 12, further comprising:
receiving, via the communication interface, position data from the target touch display device, the position data being based on touch inputs received by the target touch sensor;
determining a position of the active input device based on touch inputs received by the source touch sensor and the position data; and
unpairing the source touch display device with the active input device based on recognizing that the position of the active input device is beyond a boundary of the source touch sensor and greater than a threshold distance from a boundary of the target touch sensor.

15. The method of claim 12, further comprising:
determining a time at which the active input device will likely move from the source touch sensor to the target touch sensor; and
sending, to the active input device, a notification indicating the time to switch from providing a first touch input signal to providing a second touch input signal.

16. The method of claim 12, wherein the active input device pairing information is sent to the target touch display device based on a determined position of the active input device being within a threshold distance of a boundary of the source touch sensor.

17. The method of claim 12, wherein the active input device is paired with the target touch display device prior to the active input device moving to the target touch sensor.

18. The method of claim 12, wherein the active input device is configured to provide a plurality of different touch input signal sequences to provide touch input to different touch input devices, wherein the active input device uses a first touch input signal sequence to provide touch inputs to the source touch sensor, wherein the target touch display device pairing information includes an indication of a second touch input signal sequence orthogonal to the first touch input signal sequence, and wherein the second touch input signal sequence is usable by the active input device to provide touch inputs to the target touch sensor.

19. A source touch display device comprising:

a communication interface configured to communicatively couple the source touch display device with a target touch display device;

a source touch sensor; and a controller configured to:

receive active input device pairing information from an active input device including an identifier of the active input device, pair the source touch display with the active input device prior to the active input device moving to a target touch sensor based on the active input device pairing information, store the active input device pairing information in memory of the source touch display device;

receive, via the source touch sensor, touch inputs from the active input device;

determine that the active input device will likely move from the source touch sensor to the target touch sensor of the target touch display device based on the touch inputs;

in response to such determining, send, via the communication interface, the identifier of the active input device to the target touch display device prior to the active input device leaving the source touch sensor;

receive, via the communication interface, pairing information from the target touch display device, the pairing information including one or more of an identifier of the target touch display device, an indication of a touch input signal sequence to be used by the active input device to provide touch inputs to the target touch display device, and an available slot in a touch input frame to provide the signal sequence to the target touch display device; and prior to the active input device moving to the target touch sensor, send the pairing information to the active input device to effect a pairing between the active input device and the target touch display device.

* * * * *